No. 624,481. Patented May 9, 1899.
J. HALEY.
APPARATUS FOR MANUFACTURING WINDOW GLASS.
(Application filed May 27, 1898.)
(No Model.)
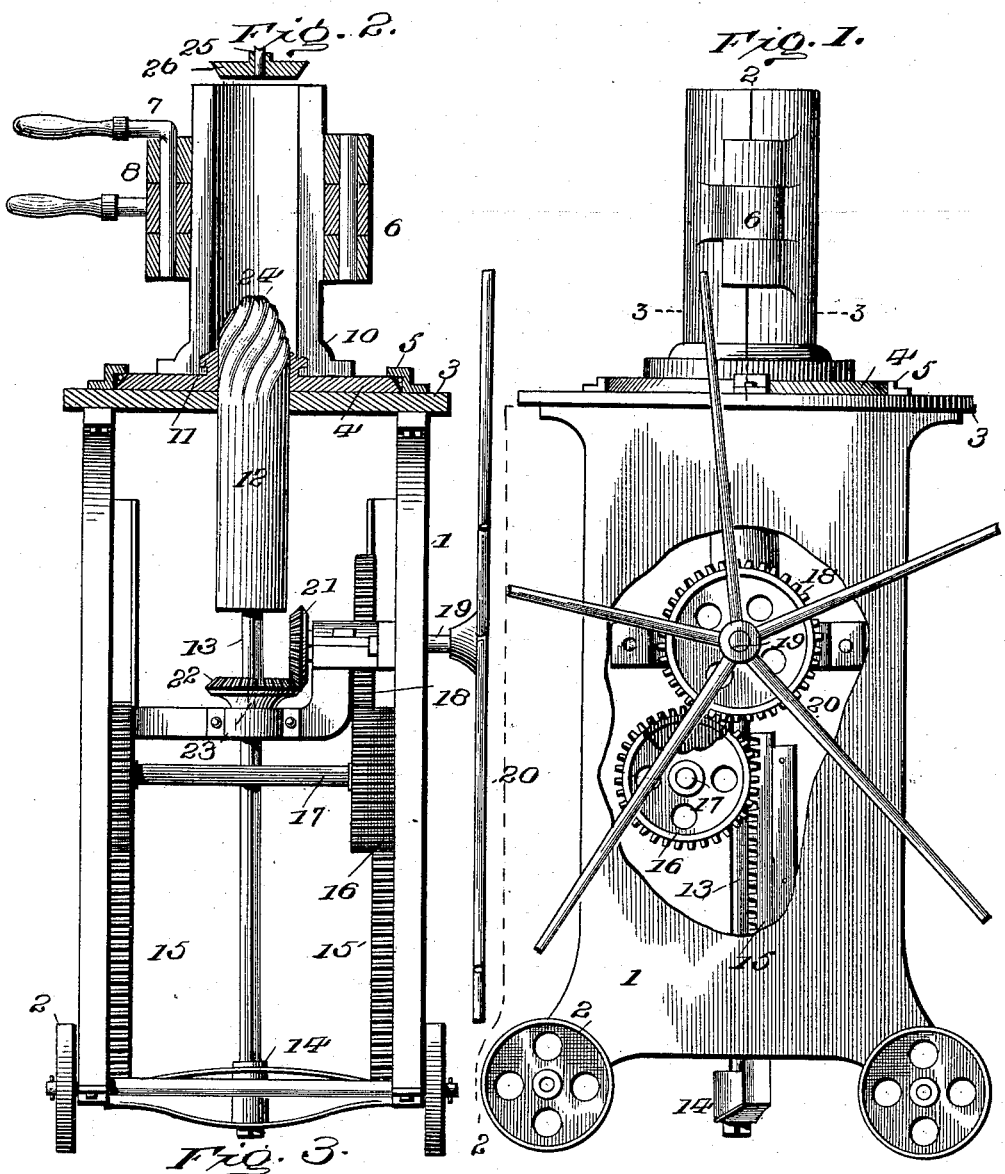

UNITED STATES PATENT OFFICE.

JONATHAN HALEY, OF BRIDGETON, NEW JERSEY, ASSIGNOR TO C. W. SHOEMAKER, OF SAME PLACE.

APPARATUS FOR MANUFACTURING WINDOW-GLASS.

SPECIFICATION forming part of Letters Patent No. 624,481, dated May 9, 1899.

Application filed May 27, 1898. Serial No. 681,872. (No model.)

*To all whom it may concern:*

Be it known that I, JONATHAN HALEY, a resident of Bridgeton, in the county of Cumberland and State of New Jersey, have invented certain new and useful Improvements in Apparatus for Manufacturing Window-Glass; and I do hereby declare the following to be a full, clear, and exact description of the invention, such as will enable others skilled in the art to which it pertains to make and use the same.

The invention relates to apparatus for manufacturing window-glass, and has for its object to increase their efficiency and to provide for the manufacture of thin window-glass of good quality.

The invention consists in the construction hereinafter described and pointed out.

In the accompanying drawings, Figure 1 is a broken front elevation of a portable apparatus for molding cylinders suitable for the manufacture of window-glass. Fig. 2 is a section taken on line 2 2 of Fig. 1. Fig. 3 is a section on line 3 3 of Fig. 1.

Numeral 1 indicates a frame supported on wheels 2 and carrying a fixed table 3. A removable mold-supporting plate is denoted by 4, and 5 indicates plate-holding brackets. The mold is shown in the present instance as made in two parts, and 6 indicates a hinge, and 7 and 8 are the locking devices. Each part of the mold has near its foot a recess 10 to receive a flange 11, fixed to the mold-plate, whereby the mold is held down upon said plate.

12 denotes a plunger which in practice is coated with paste. It is supported upon a spindle 13, that is rotatably held in a crossbar 14. Fixed to said bar are racks 15, which mesh with gears 16. These are fixed on a shaft 17 and driven by a gear 18, that meshes with one of said gears 16. The gear 18 is fixed to a shaft 19, which has a driving-wheel 20. On the inner end of shaft 19 is a bevel-gear 21, that drives a similar gear 22, loose on the spindle 13, but having a spline connection to insure mutual rotation. 23 denotes a spline. By the operation of these gears and racks moved by the wheel 20 the plunger is pushed up into the mold and simultaneously rotated.

In operation molten glass is poured into the mold and formed into a cylinder by the joint action of the mold and plunger. To prevent the plunger from pushing up the whole body of glass, it has been customary to provide a recess in the mold to receive a considerable portion, which by its cohesive and adhesive force prevented the separation of the glass wall formed between the plunger and mold at the lower part of the latter. This practice produced on the glass cylinder formed a superfluous ring or projection of glass formed by the aforesaid recess, which required separation as waste. To obviate these evils and the undue lifting of glass by the plunger, it is, according to the present invention, rotated during its ascent by means such as above described. The rotation of the plunger neutralizes its tendency to unduly push up the glass. As a further preventive the plunger is provided with threads 24 in the nature of screw-threads. These give the plunger when suitably rotated greater penetration and act to hold down the glass and prevent a rupture of the cylinder. The rotation of the plunger also smooths the interior of the tube and prevents the forming of mold-marks, and the smooth unthreaded part of the plunger is made practically as long as the mold to avoid leaving the marks of the plunger-threads in the finished cylinder. The beginnings of the threads are slight, as indicated, so that the part of the plunger in which the threads have their origin is not contracted, and rotation of the plunger obviates all marks in the article at that point. The length of the plunger, however, need not be limited to placing the origin of the threads within a length of the plunger equal to that of the mold, a greater length being within the scope of the improvement. The body portion of the plunger being smooth and truly cylindrical is adapted to remove marks left by its threaded portion, the exterior of which is situated in and within the cylindrical plane of the body portion, as shown.

25 denotes an air-pipe, and 26 a cover by which the pipe may be supported upon the top of the mold. If desired, air under pressure may be forced into the upper part of the mold to press the glass down about the plunger and aid in forming the glass cylinder.

This cover is made movable, so as not to interfere either with pouring or with the action of the threaded plunger.

The improvement is not limited to the parcular form of the upper end of the plunger and of its threads as illustrated. The said end may be made more or less blunt, and the pitch and number of the threads can be varied; but these threads should have a slight depth, particularly near their origin, and a large pitch, substantially as shown, to avoid marking the interior of the cylinder.

Having described my invention, I claim—

1. In an apparatus for molding glass cylinders, a mold, and a rotating plunger, said plunger having inclined threads or the like at its forward end, the plunger being longer than the mold, and the exterior surface of its threaded portion situated in and within the exterior cylindrical plane of the body portion.

2. In an apparatus for molding glass cylinders, a mold, a plunger, and removable devices for introducing air into the mold to force the glass down about the plunger, said plunger being longer than the mold.

3. In an apparatus for molding glass cylinders, a mold, a plunger, and devices for imparting to the plunger both a rotary and longitudinal motion within the mold, the plunger being longer than the mold and provided at its free end with inclined threads made shallow near their origin and having a large pitch whereby marking the molded cylinder is avoided.

4. In an apparatus for molding glass cylinders, a mold, a plunger provided with a spindle, a gear having a spline connection with the spindle, mechanism to rotate the gear, and mechanism to move the spindle lengthwise, said plunger having an approximately conical free end provided with shallow threads of large pitch, said threads being situated in and within the exterior cylindrical plane of the body portion.

In testimony whereof I have signed this specification in the presence of two subscribing witnesses.

JONATHAN HALEY.

Witnesses:
ISAAC L. STETSER,
WALTER H. BACON.